United States Patent [19]

Winters et al.

[11] 4,129,202

[45] Dec. 12, 1978

[54] AIRCRAFT BRAKE TORQUE LIMITER

[75] Inventors: Harry K. Winters; Warren D. Chambers, both of South Bend, Ind.

[73] Assignee: The Bendix Corporation, Southfield, Mich.

[21] Appl. No.: 826,799

[22] Filed: Aug. 22, 1977

[51] Int. Cl.² .............................................. B60T 8/12
[52] U.S. Cl. ................................. 188/181 T; 303/112
[58] Field of Search ............... 188/180, 181 R, 181 T; 303/112

[56] References Cited

U.S. PATENT DOCUMENTS

| | | | |
|---|---|---|---|
| 2,243,449 | 5/1941 | Aikman | 303/112 |
| 3,724,610 | 4/1973 | Caero | 188/181 T |
| 3,773,365 | 11/1973 | Horowitz et al. | 303/112 |

*Primary Examiner*—Duane A. Reger

*Attorney, Agent, or Firm*—Leo H. McCormick, Jr.; Ken C. Decker

[57] ABSTRACT

In an aircraft multiple disc brake assembly, an excessive total brake torque can be experienced during favorable, dry, conditions. To limit the brake torque to a predetermined maximum, the plurality of conventional brake piston assemblies are modified to provide a pressure responsive surface area which is in an opposing relationship to the braking force. When a predetermined amount of braking torque is experienced, conventional electronics employing strain gauge sensors control a solenoid valve to vent pressurized brake fluid to the opposing surface area thereby reducing the braking force and limiting the total braking torque experienced by the brake assembly to a predetermined maximum amount. The brake pressure is not affected by this system.

12 Claims, 4 Drawing Figures

AIRCRAFT BRAKE TORQUE LIMITER

BACKGROUND OF THE INVENTION

The present invention relates to aircraft multiple disc brake assemblies using either conventional or carbon composite frictional material.

Aircraft multiple disc brakes are designed to achieve a given maximum stopping distance under both favorable, dry, and unfavorable, wet, conditions. In many environments, especially for commercial aircraft, the brakes must be capable of producing sufficient torque to stop the airplane from high speed in a fixed maximum allowable distance, as in a rejected-take-off (RTO). Generally, the friction characteristics of the friction material in the brake are poorer when wet than when they are dry and usually the brake pressure is fixed to a maximum allowable amount. These design considerations thereby require the brake piston size to be larger than necessary for dry conditions in order to produce the required braking torque under wet conditions. On the other hand, there are maximum torque limits set for brake performance usually because of structural limitations of the landing gear strut or strut mountings. In some cases these different torque requirements are incompatible because the brake with pistons large enough to provide sufficient torque when the friction material is wet, provide too much torque when the friction material is dry. This is particularly important for brake assemblies utilizing carbon composite friction surfaces which exhibit significantly different friction characteristics under unfavorable and favorable conditions, having poor and good coefficients of friction, respectively.

To solve this dry-over torque condition, various torque-limiters were developed. Reference is made to U.S. Pat. Nos. 2,764,263 and 2,781,871 for typical systems known in the brake art that utilize "pressure dumping" techniques. "Pressure dumping" systems are also common to vehicle brake anti-skid systems. "Pressure dumping" occurs when a torque overload condition is detected such that the pressurized brake fluid, which is acting upon the brake pistons to produce the torque, is partially vented, i.e. "dumped", to a lower pressure reservoir or sump. This "dumping" lowers the pressure acting upon the brake pistons, thereby reducing the braking torque.

"Pressure dumping" torque limiting systems have several serious disadvantages. One is that when the system dumps fluid upon signal from the torque overload sensor there is no lower limit to how low the pressure can drop. If for example, the system response is so slow that the brake pressure drops to near zero, the brake does not produce an average torque sufficiently high to make stop distance requirements and the aircraft experiences large oscillations in deceleration rate, making for an uncomfortable stop. Secondly, overdumping of brake fluid is wasteful of fluid in a displacement limited system and the overdumping slows down response time of the system. In addition, the pressure reduction system is not self-contained in the brake, thus complicating system installation and maintenance.

SUMMARY OF THE INVENTION

The present invention provides a simple brake torque limiter system that does not utilize conventional brake pressure dumping techniques. Although the present invention was developed to solve excessive torque characteristics inherent in carbon brake assemblies, the invention is equally applicable to conventional brakes that require torque limiters to prevent structural failure under favorable braking conditions. The invention modifies the brake pressure pistons of a conventional aircraft multiple disc brake to include a differential pressure surface area in an opposing relationship to the pistons' brake force producing surface area. This opposing differential surface area is continuously vented to a source of low fluid pressure until an over-torque condition occurs whereby an electrically operated solenoid valve communicates pressurized brake fluid to the differential surface area. The force created by the differential surface area opposes the braking force to thereby limit the total braking torque to a predetermined maximum amount. It is important to note that the present invention does not effect the brake pressure and only requires a small additional amount of fluid.

The solenoid valve is operated by an electronic system of conventional design which incorporates strain gauge sensors mounted at various strategic torque transmitting points in the wheel and brake assembly. Reference is made to U.S. Pat. No. 2,992,860 for an anti-skid system utilizing an electronic control incorporating strain gauge sensors.

Although the use of differential pressure surface areas in the aircraft brake piston environment is well known as evidenced by U.S. Pat. Nos. 3,789,738; 3,915,063; 3,995,721; and 4,006,669, applicants provide a specific combination for a different result.

Also related to the present invention is U.S. Pat. No. 3,729,235 for an integrated brake booster combined with an anti-skid system which utilizes the opposing surface areas of a hydraulic piston to totally relieve brake force. Although the end result on the pressurized pistons in U.S. Pat. No. 3,729,235 is similar, applicants' claimed combination provides a novel result not heretofore found in the aircraft brake environment.

The applicants' invention has several advantages over the prior art systems. First, the brake pressure does not change, only the effective brake piston area changes which allows a simple system that can be located near the brake envelope thereby eliminating long fluid lines to speed up system response. Second, because the brake pressure is unaffected by the present invention, the operation of the conventional anti-skid systems are not affected. Reference is made to U.S. Pat. Nos. 3,556,614 and 3,574,426 for typical aircraft anti-skid systems. Third, because the present invention is simple and contains few parts, it can be completely self-contained in the brake area. Last, and most important, in case of system failure, an over-torque condition can exist, but a malfunction can never cause a loss of brake pressure.

It is an object of the present invention to provide a torque limiter that does not dump pressurized brake fluid so as to change brake fluid pressure and thereby affect the anti-skid systems.

Another object of the invention is to provide a torque limiter that is relatively simple in construction so as to be reliable, fast in operation, and self-contained in the wheel and brake envelope.

A further object of the present invention is to provide a torque limiter system that protects against loss of brake pressure if the system malfunctions.

DESCRIPTION OF THE PREFERRED EMBODIMENT

Figure 1:
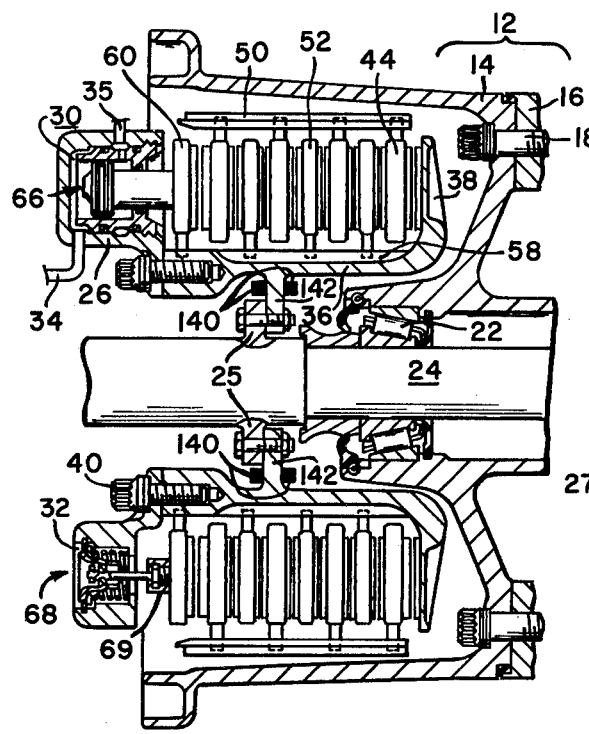
FIG. 1 is a sectional schematic representation of a conventional flange mounted aircraft wheel and brake assembly embodying the present invention.
Figure 2:
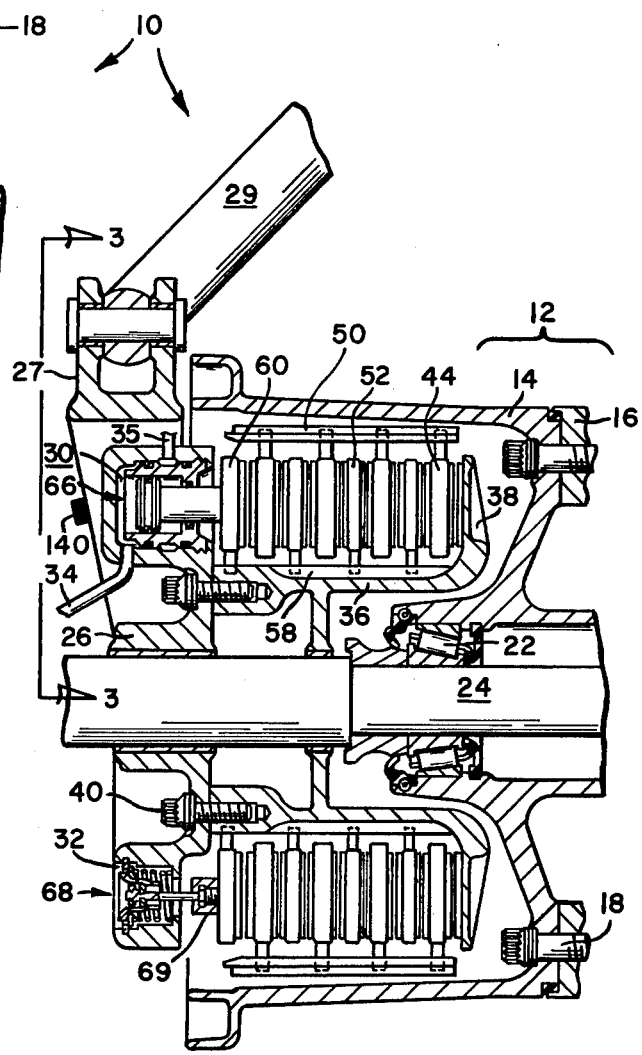
FIG. 2 is a sectional schematic representation of a conventional torque arm mounted aircraft wheel and brake assembly embodying the present invention.

FIGS. 1 and 2 depict two conventional types of multiple disc aircraft brake assemblies known as flange mounting and torque arm mounting, respectively. Both figures have been modified to include applicants' invention described later with the same numerals describing like parts. Numeral 10 designates the entire wheel and multiple disc brake assembly. The wheel 12 is defined by two annular sections 14, 16, only one of which is fully shown, fastened together by circumferentially spaced apart bolts and nuts generally indicated by 18. Reference is made to U.S. Pat. Nos. 2,990,216 and 2,998,282 for a detailed discussion of the wheel construction. The wheel 12 is rotatably journaled by bearing means 22 on a non-rotatable fixed axle 24 carried by conventional aircraft landing gear structure, not shown. An annular brake carrier 26 is secured in a non-rotatable position relative to the wheel by any suitable means known to those skilled in the art; for example, the flanged mounting method shown in FIG. 1 has carrier 26 bolted through torque tube 36 to a flange member 25 secured to axle 24 while the assembly illustrated in FIG. 2 depicts torque arm mounting wherein carrier 26 is carried by axle 24 and fixed in its position relative to the wheel 12 by a flange arm 27 and torque arm member 29 secured directly to the landing gear structure, not shown. The torque arm member 29 is depicted better in FIG. 3. Brake carrier 26 is provided with a plurality of circumferentially spaced apart cavities 30 and holes 32, only one of each is shown. As will be explained later with reference to FIG. 4, cavities 30 are divided into two variable volume chambers; one fluidly connected via passage 34 to a source of pressurized fluid, not shown, controlled by the aircraft pilot; the other fluidly connected via passage 35 to the apparatus of applicant's invention. A generally cylindrical torque tube 36 having an integral annular backing plate 38 is fixedly secured to carrier 26 by a plurality of circumferentially spaced apart bolts 40. A plurality of spaced apart annular brake rotor members 44 are suitably keyed to a plurality of circumferentially spaced apart key or retaining members 50. The retaining members 50 are fixedly secured to wheel section 14 and are adapted to permit axial movement of the rotor members 44 relative to wheel section 14 while rotating therewith. A plurality of non-rotatable annular brake stator members 52 are interleaved with the rotor members 44 and keyed to a plurality of circumferentially spaced apart spline sections 58 of torque tube 36 for axial movement relative therealong. A pressure plate 60 is suitably keyed to spline sections 58 for axial movement therealong.

A plurality of fluid pressure responsive piston assemblies, generally indicated as 66 are disposed in cavities 30 and bear against the pressure plate 60. Brake adjusting and retraction units generally indicated as 68 are disposed in circumferentially spaced apart holes 32 and secured at 69 to the pressure plate 60. The construction and operation of both piston means 66 and adjusters 68 are well known in the aircraft brake art and reference is made to U.S. Pat. No. 3,376,959 for a detailed discussion. For the purposes of this disclosure it is sufficient to understand that upon a brake application, pistons 66 are simultaneously pressurized thereby axially displacing pressure plate 60 towards backing plate 38. The axial displacement of pressure plate 60 compresses the rotor members 44 and stator members 52, into engagement thereby retarding the rotation of the wheel 12. Pistons 66 are adapted to have an axial travel sufficient to compensate for the accumulated axial wear of the frictional surfaces. Upon brake depressurization, the pressure plate 60 and thus pistons 66 are axially retracted a predetermined distance under the influence of the brake adjusters 68, thereby establishing a corresponding brake running clearance between adjacent surfaces of the brake assembly. The adjusters 68 also serve to automatically axially advance the pressure plate 60 to compensate for wear of the frictional surfaces.

Figure 4:
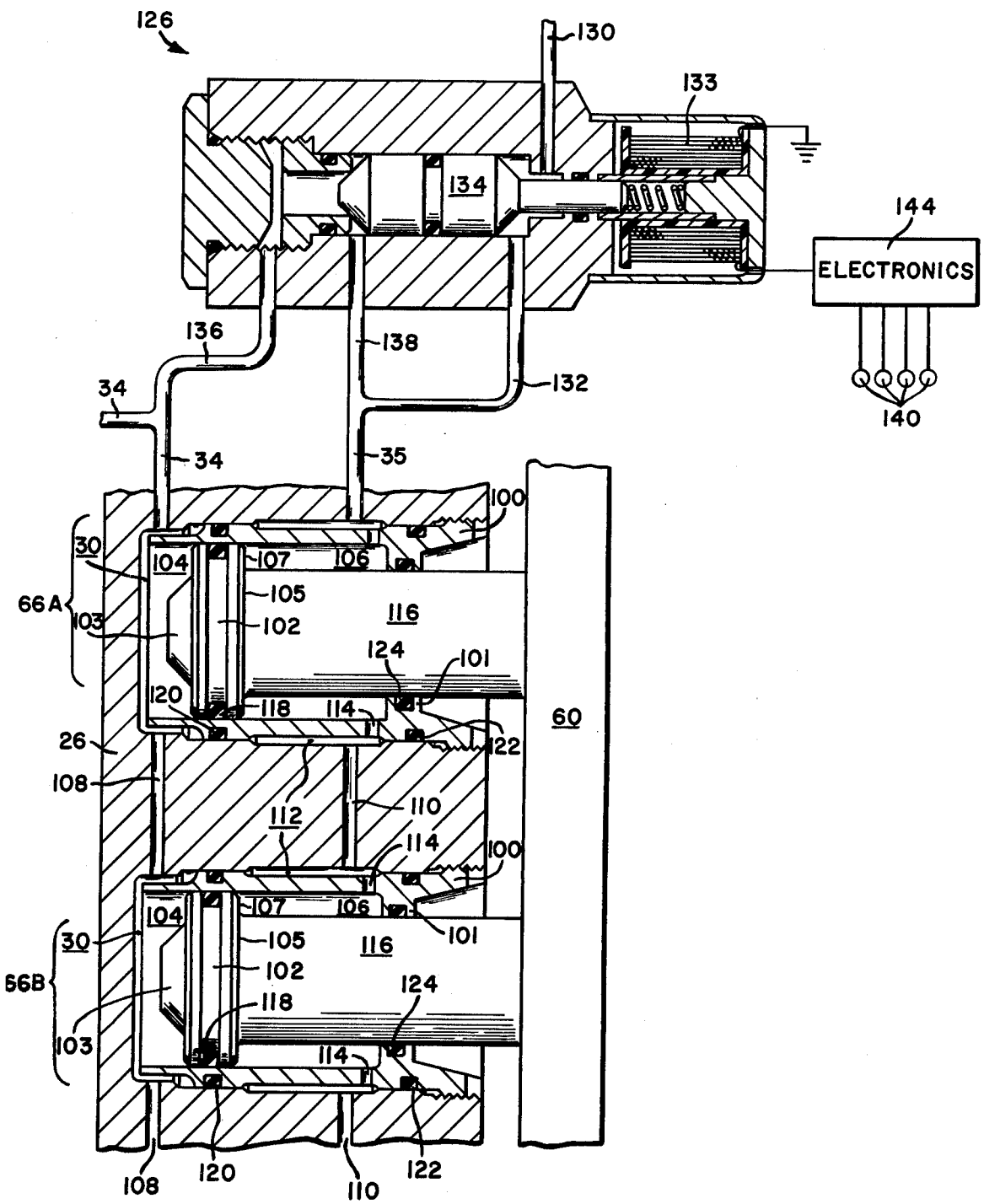
FIG. 4 is a sectional schematic representation of the brake piston assemblies embodying the present invention.

Applicants' invention conveniently adapts the above-described plurality of piston assemblies 66 in order to provide the torque limiter system as shown in detail by FIG. 4. Two piston assemblies 66A and 66B are shown in a portion of carrier 26. Each piston means has a cylinder liner 100 threaded into carrier 26. Liner 100 has inward flange portion 101 and slidably contains piston 102 thereby dividing cavity 30 into two variable volume chambers 104, 106. Piston 102 has pressure responsive surface areas 103, 105. Carrier 26 and each liner 100 are adapted to have all chambers 104 fluidly interconnected via passages 108 and all chambers 106 fluidly interconnected via passages 110, circumferential grooves 112 and holes 114. Cylinder 116 secured to piston 102, shown integral therewith, is slidably contained by flange portion 101 of liner 100 and bears against pressure plate 60. The overall torque design requirements determine the diameter of cylinder 116 which is adapted to reduce the amount of piston surface area 105 exposed to fluid in chamber 106. As shown, only annular surface area 107 is exposed in chamber 106 and for applicants' purposes area 107 is approximately twenty percent of area 105 thereby creating only a small annular area 107. Conventional fluid pressure seals 118, 120, 122, 124 are contained by the various members described above in order to prevent fluid leakage.

Applicant's invention also includes an electrically operated solenoid fluid valve generally indicated as 126. Valve 126 is used to control the fluid pressure in chambers 106. As shown in the de-energized position, valve 126 communicates a fluid at low pressure to chambers 106 via passages 130, 132, and 35. Upon energization, spool member 134 is pulled toward the right by coil 133 closing passages 130, 132 and opening passages 136, 138 thereby communicating high pressure to chambers 106 via passages 34, 136, 138 and 35. Valve 126 is of conventional construction and can be adapted to allow a quick or graduated pressure rise to chambers 106.

Figure 3:
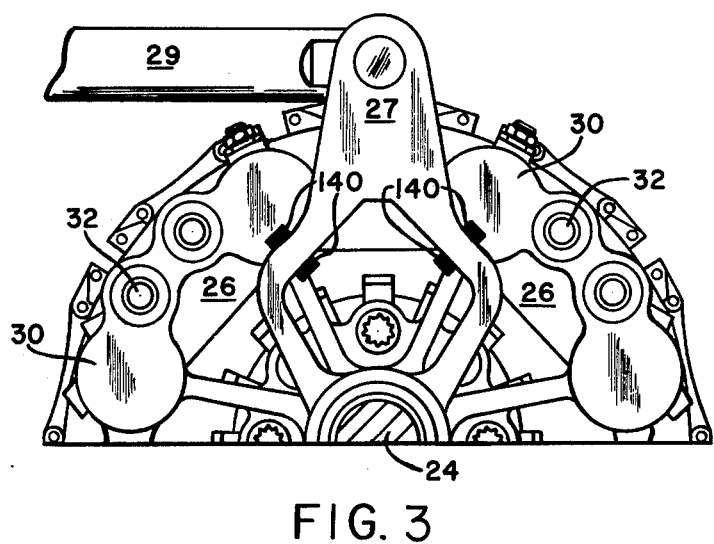
FIG. 3 is a partial end view of the torque arm mounted wheel and brake assembly of FIG. 2 taken along the line 3—3.

Conventional strain gauge sensors 140 that change their electrical resistance characteristics when subjected to forces causing their elongation are placed in strategic spots in the aircraft brake assembly in order to measure the total braking torque experienced at a given moment. FIG. 1 indicates the placement of a plurality of sensors 140 on opposite sides of and circumferentially spaced along the junction of flange 25 secured to axle 24 and flange 142 extending from torque tube 36. FIGS. 2 and 3 indicate the placement of a plurality of sensors 140 on opposite sides of flange arm 27 which is secured to carrier 26 and the landing gear through torque arm member 29. Conventional electronic circuitry 144 is adapted to energize valve 126 when a predetermined torque is experienced by the brake assembly. As indicated in FIGS. 1 and 3, a plurality of sensors are arranged in an opposite relationship in order to cancel the effects of bending forces and yield a pure torque force measurement.

Assuming that the brake assembly embodying the present invention is in the position as shown in FIGS. 1, 2 and 4, a brake application by the aircraft pilot results in pressurization of the fluid supplied to chambers 104 which acts on surface 103 to axially extend the stroke of pistons 102 with respect to the carrier 26. The stroke extension of pistons 102 forces pressure plate 60 toward backing plate to compress rotor members and stator members together to produce the desired braking action of wheel 12. If a condition exists that forces the aircraft pilot to exert brake pressure such as in a RTO condition, the pistons 102 exert great force on pressure plate 60 and the rotors and stators thereby developing a large braking torque. This torque must be absorbed by the components of the wheel and brake assembly and the landing gear structure. If too much torque is developed, as in a case utilizing carbon friction material in a dry, RTO condition, structural failure can occur to the extent of having the landing gear ripped off the airplane body. To limit this extreme torque condition, applicants' invention utilizes the sensors 140 and electronics to signal when the highest safe predetermined torque limit has been reached thereby energizing valve 126. High brake fluid pressure is then communicated to chambers 106 in order to act upon piston surface area 107 which thereby opposes surface 103 to limit the maximum torque developed by the brake assembly. When the brake torque drops below the predetermined maximum, the valve 126 is de-energized and chambers 102 are vented to the lower pressurized fluid. In order to prevent an oscillatory operation around this predetermined maximum amount, applicants' embodiment de-energizes the valve 126 at a lower torque limit which produces the minimum torque allowable for an RTO.

It is understood that minor changes based upon teachings well known in the art may be made without deviating from the scope of applicants' claimed invention, for example: the placement of the sensors may be changed; or the solenoid valve may be adapted to provide a fluid delay or graduated pressure rise; or the electronics can be adapted to provide an electronic time delay; or the pressure in chamber 106 may be different from the brake pressure; or the solenoid valve may be the pilot valve to a spool valve arrangement; or the torque may be measured and subsequently control the valve by mechanical apparatus without the use of electronics.

We claim:

1. An aircraft multiple disc brake assembly comprising:
   a set of rotors mounted for rotation with a member to be braked;
   a set of stators mounted on a torque-absorbing member and adapted to frictionally engage said rotors to effect a brake application;
   fluid pressure responsive means secured to said torque-absorbing member for creating a braking torque by urging said rotors and stators into braking engagement, said fluid pressure responsive means including:
   a housing having a bore therewithin with first and second axial ends;
   a piston slidably disposed in said bore for effectuating said frictional engagement of said rotors and stators, said piston having first and second fluid pressure responsive surface areas cooperating with said bore's first and second axial ends to define first and second variable volume chambers, respectively;
   means for communicating pressurized fluid into said first chamber to urge said piston in a brake application effecting direction;
   sensor means operatively connected to said brake assembly for generating a signal when said brake torque generated by said brake reaches a predetermined level; and
   valve means responsive to said signal generated by said sensor means for communicating pressurized fluid to said second chamber to oppose the fluid pressure force generated in said first chamber and thereby limit said brake torque to a predetermined maximum.

2. An aircraft multiple disc brake assembly, as claimed in claim 1 wherein said sensor means includes:
   a plurality of strain gage sensors fixed to said torque-absorbing member each of which have a change in electrical resistance when subjected to force that causes a corresponding dimensional change; and
   electronic means responsive to said change in electrical resistance for developing said signal to operate said valve means.

3. An aircraft multiple disc brake assembly as claimed in claim 1, wherein:
   said first fluid pressure responsive surface area of said piston is greater than said second fluid pressure responsive surface area; and
   said valve means communicates pressurized fluid in said first chamber to said second chamber in response to said signal.

4. An aircraft multiple disc brake assembly as claimed in claim 3, wherein:
   said piston means further includes a force transmitting member having two ends, one said end secured to said piston means, the other said end adapted to pass through one of said bore's axial ends into operational engagement with said rotors and stators.

5. An aircraft multiple disc brake assembly as claimed in claim 4, wherein:
   said force transmitting member is cylindrical in shape and secured to said piston means in a manner to establish the amount of said second surface area exposed to said fluid pressure.

6. An aircraft multiple disc brake assembly as claimed in claim 1, further including:
   a first source of pressurized fluid for effecting a brake application being connected to said first chamber;
   second and third sources of pressurized fluid, said third source being at lower pressure relative to both said first and second sources of pressurized fluid; and
   said valve means fluidly connected to said second and third sources of pressurized fluid and said second chamber, such that whenever a brake application is effected said valve means communicates said third source of pressurized fluid to said second chamber until said input signal is received thereby switching said second variable volume chamber from said third to said second source of pressurized fluid.

7. An aircraft multiple disc brake assembly as claimed in claim 6, wherein:
said first surface area is greater than said second surface area; and
said first and second sources of pressurized fluid are one and the same.

8. An aircraft multiple disc brake assembly as claimed in claim 7, wherein:
said valve means is electrically operated having a normally open passage connected to said third source of pressurized fluid and a normally closed passage connected to said second source of pressurized fluid; and
said sensor means includes a strain gauge sensor and electronic means for providing an electrical output when a predetermined strain value is reached.

9. An aircraft multiple disc brake assembly as claimed in claim 1, wherein:
said predetermined level of torque needed to generate said sensor's signal equals said predetermined maximum torque.

10. In a aircraft having a wheel rotatable about an axis, a multiple disc brake assembly for controlling said wheel comprising:
a torque-absorbing member mounted on said aircraft;
a set of rotors mounted for rotation with said wheel;
a set of stators mounted on said torque-absorbing member and adapted to frictionally engage said rotors;
fluid pressure responsive means carried by said torque-absorbing member to urge the rotors and stators into frictional engagement with one another when a brake application is effected, said fluid pressure responsive means including a housing defining a bore therewithin, a piston slidably mounted in said bore for effectuating said frictional engagement of said rotors and stators and cooperating with opposite ends of said bore to define a pair of variable volume, fluid pressure receiving chambers between fluid pressure responsive areas on opposite ends of the piston and corresponding ends of the bore; and means for communicating fluid pressure into one of said chambers to urge said piston in a brake application effecting direction;
sensor means operably connected to said brake for generating a signal when the brake torque generated by said brake reaches a predetermined level; and
valve means responsive to the signal generated by the sensor to communicate fluid pressure to the other chamber to oppose the fluid pressure force generated in said one chamber and thereby limit the brake torque to a predetermined maximum.

11. The invention of claim 10, wherein said valve means communicates said other chamber to said one chamber when said signal is generated.

12. The invention of claim 10, wherein said valve means is shiftable in response to said signal from a first condition venting said other chamber to a second condition communicating said other chamber to said one chamber.

* * * * *